Dec. 8, 1959      R. OWEN      2,916,395
HEAT-SENSITIVE COPY-PAPER
Filed July 21, 1958
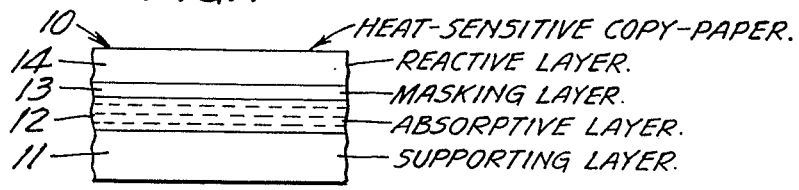
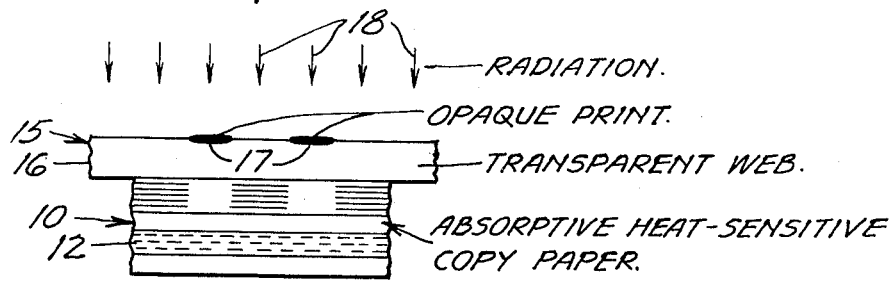
INVENTOR
RICHARD OWEN
BY
Carpenter, Abbott, Coulter & Kinney
ATTORNEYS

United States Patent Office 2,916,395
Patented Dec. 8, 1959

2,916,395

HEAT-SENSITIVE COPY-PAPER

Richard Owen, Brooklyn Center, Minn., assignor to Minnesota Mining and Manufacturing Company, St. Paul, Minn., a corporation of Delaware Application July 21, 1958, Serial No. 749,905

3 Claims. (Cl. 117—36)

This invention relates to heat-sensitive copypaper having particular utility in copying from graphic originals, such as stencils, having a pattern comprising transparent and opaque areas.

The products of this invention are useful in the preparation of positive copies of photographic negatives. In a typical procedure, the negative, consisting of an opaque silver-containing black image on a transparent film supporting layer, is placed over the heat-sensitive copy-paper and the whole then briefly irradiated with intense radiant energy. There is obtained in the copy-paper a reverse or positive image of the original negative. As is common in heat-copying procedures, the copy is obtained directly, without the necessity of subsequent chemical or other developing procedures. The copy-paper is stable towards normal conditions of storage and use, both before and after being subjected to the copying procedure.

The copy-paper and a method of copying therewith are illustrated in the accompanying drawing in which Figure 1 is a schematic representation in cross-section, and not necessarily to scale, of the copy-paper, and Figure 2 similarly illustrates the copying procedure.

In making the embodiment illustrated in Figure 1, a supporting layer 11, such as paper, is first coated with an absorptive layer 12, preferably a suspension of carbon black or other highly absorptive colored pigment in a solution of a film forming polymeric binder. Coated papers of this type are commercially available and may be used. Over the opaque absorptive layer is applied a thin masking layer, consisting, for example, of a suspension of 33 parts by weight of titanium dioxide pigment in a solution of 7 parts of ethyl cellulose in 60 parts of methyl ethyl ketone. The wet thickness of the coating is about 3.5 mils (0.0035 inch); after drying, the coating is just sufficient to mask the black undercoat from view but does not prevent transmission of the radiant energy employed in the copying process. The sheet is then further coated with a chemically reactive visibly heat-sensitive layer, such for example as a 2 mil layer of a composition made up of 10 parts of a dispersion of 19.2% ferric stearate, 4.8% ethyl cellulose, balance acetone, and 17 parts of a solution of 2.78% t-butyl catechol, 7.2% ethyl cellulose, balance acetone; and is then again dried.

In making a reproduction of a graphic original as illustrated in Figure 2, the original 15, consisting of transparent web 16 carrying opaque printed areas 17, is placed over, and generally but not necessarily in close contact with, the reactive layer of the heat-sensitive copy-paper 10, and the composite is then briefly irradiated with intense radiant energy indicated by arrows 18. Radiation is prevented from passing through the printed areas 17, but is transmitted through the transparent unprinted areas to the copy-paper 10, where it reaches and is absorbed in the layer 12. The resulting heat pattern then causes a visible reaction to occur in the reactive layer, as indicated in the drawing.

When the same heat-sensitive composition is coated on white untreated paper and similarly exposed, a similar reproduction is obtained but the power requirements are essentially doubled. For example, in a specific comparison the sheet containing the additional layers requires only 35 watt seconds per square inch, whereas the sheet prepared with the uncoated paper requires 68 watt seconds per square inch for the production of an equivalent image. In both instances a high contrast ratio between the intensely colored image areas and the white background areas is obtained.

Exactly the same effect is obtained by substituting a perforated or cut-out opaque or reflective stencil or mask for the printed web 15. The radiation reaches the copy-paper only through the perforations, and the visibly heat-sensitive reaction occurs only at the irradiated areas.

Where the radiation is absorbed in the printed or solid areas of the original, the duration of the radiation must be sufficiently low and its intensity sufficiently high to avoid undue heating of the copy-paper beneath such areas. With reflective areas, more prolonged exposure at lower intensity is possible.

In another example, the heat-sensitive reactive layer 14 is produced from a thin coating of a mixture of 10 parts by weight of ethyl cellulose, 10 parts of basic lead carbonate, and two parts of thiourea in 156 parts of alcohol, prepared by milling in a ball mill until smooth. When such a mixture is coated directly on white paper the resulting sheet is insensitive to temperatures normally available in thermographic processes. When coated on the radiation-absorptive base, however, sufficient radiation is absorbed in the copying process as above described to produce an effective reproduction. At the same time, the background areas remain uncolored or undarkened so that the resulting reproduction is high in contrast.

Many other chemically reactive and visibly heat-sensitive coating compositions are known and are equally useful in producing the heat-sensitive copy sheets of this invention.

The specific heat-sensitive layers hereinbefore described are light-colored and in the thicknesses employed are substantially transparent. They readily transmit most or all of the radiant energy used for the copying process. Other less transmissive layers are also useful, these also being significantly improved by the presence of the underlying highly absorptive layer, and the final appearance of the reproduction being improved by the presence of the white or light-colored visibly opaque masking layer.

It is to be understood also that various other dark-colored pigments, e.g. iron oxide or zinc black, may be substituted for the carbon black and that the radiation-absorptive layer may be substantially coextensive with the supporting web if desired. Similarly, zinc oxide or zinc sulfide may replace the titanium dioxide pigment in many instances. Polystyrene, chlorinated rubber, and other binders may be employed in the pigment layers as well as in the heat-sensitive layer.

Where the composition is visibly changed at temperatures normally available for thermographic reproduction, the invention provides a means for greatly increasing the speed of the operation, or alternatively for reducing the quantity or intensity of radiant energy required. With compositions requiring higher temperatures, and which have therefore previously been unavailable for thermographic reproduction, the invention provides means for increasing the sensitivity of the resulting coated sheet so that the amount of energy available from a tungsten filament or equivalent restricted source becomes sufficient to produce the required reaction resulting in the desired visible change. Since the heating effect occurs within the heat-sensitive layer itself rather than at the printed original as in many previously available heat-printing methods, over-exposure of the original to excessive temperatures is avoided. In many instances the filament or other source supplying the radiant energy may be operated at lower voltage than would otherwise be required, thereby extending its useful life.

What I claim is as follows:

1. A heat-sensitive copy-paper adapted for making reproductions of stencil-like graphic originals by exposure through said original to intense radiant energy and comprising, in order, a supporting base, a radiation-absorptive layer comprising a dark colored pigment, a radiation-transmissive masking layer comprising a white pigment, and a chemically reactive visibly heat-sensitive layer.

2. A heat-sensitive copy-paper adapted for making reproductions of stencil-like graphic originals by exposure through said original to intense radiant energy and comprising, in order, a dark colored opaque radiation-absorptive supporting base, a white radiation-transmissive masking layer, and a chemically reactive visibly heat-sensitive layer.

3. A heat-sensitive copy-paper adapted for making reproductions of stencil-like graphic originals by exposure through said original to intense radiant energy and comprising, in order, a paper base, a radiation-absorptive coating of carbon black in a polymeric binder, a radiation-transmissive coating of titanium dioxide in a polymeric binder and in a thickness just sufficient to mask the black radiation-absorptive coating, and a chemically reactive visibly heat-sensitive layer.

References Cited in the file of this patent

UNITED STATES PATENTS

| 1,976,302 | Sheppard | Oct. 9, 1934 |
| 2,663,657 | Miller | Dec. 22, 1953 |
| 2,844,733 | Miller | July 22, 1958 |